(No Model.) 2 Sheets—Sheet 1.
J. BERNTSEN.
BREAD RAISING APPARATUS.
No. 569,605. Patented Oct. 20, 1896.
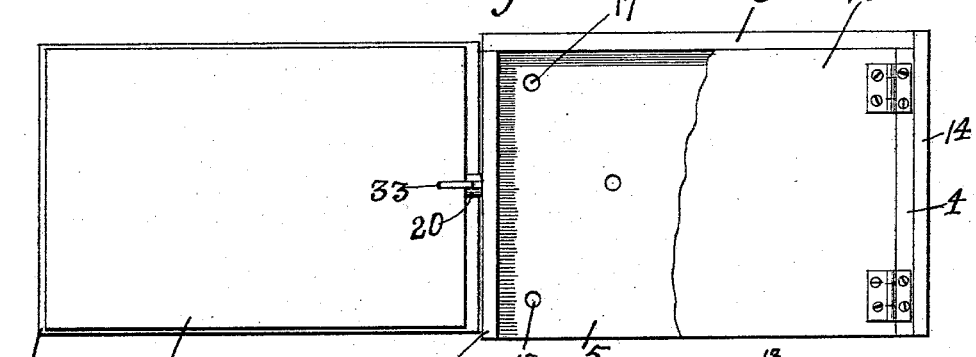
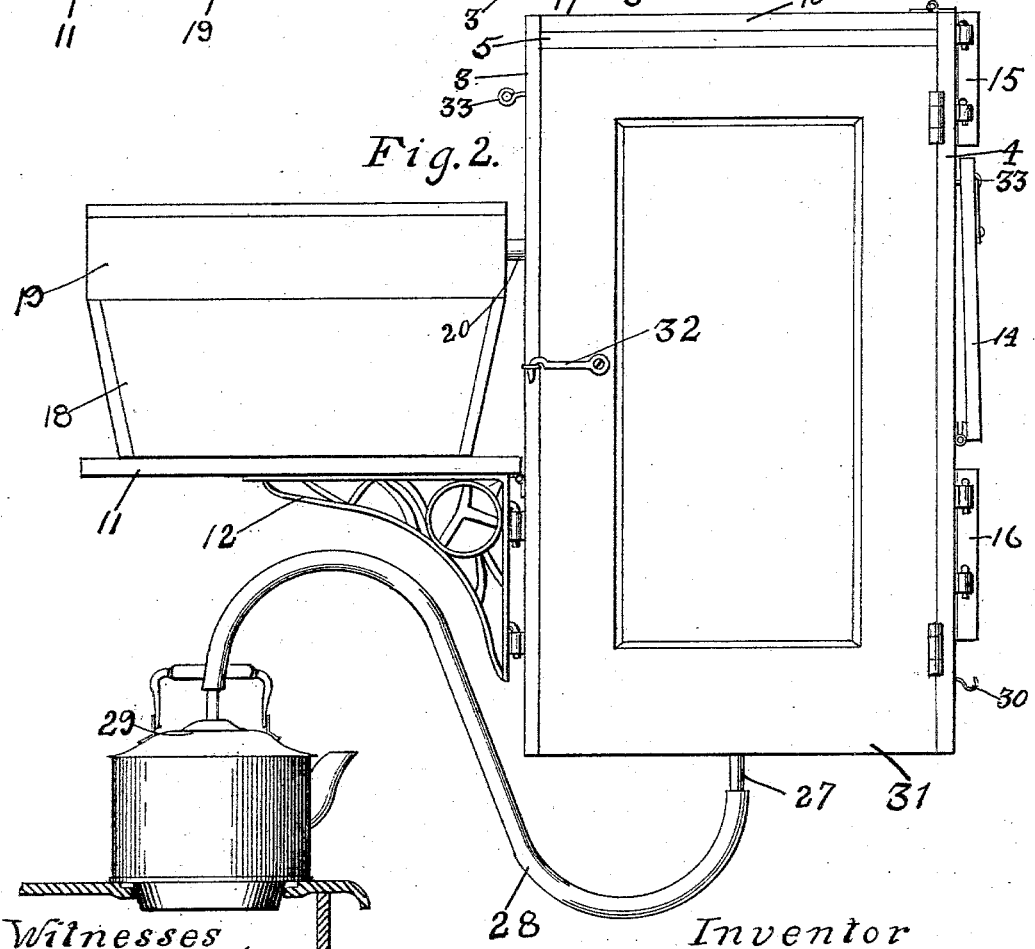
Witnesses
B. L. Shepherd.
Richard Paul
Inventor
John Berntsen
By Paul & Hawley
his Attorneys (No Model.) 2 Sheets—Sheet 2.

J. BERNTSEN.
BREAD RAISING APPARATUS.

No. 569,605. Patented Oct. 20, 1896.

Witnesses
B. S. Shepherd
Richard Paul

Inventor
John Berntsen.
By Paul & Hawley
his Attorneys

UNITED STATES PATENT OFFICE.

JOHN BERNTSEN, OF ALBERT LEA, MINNESOTA.

BREAD-RAISING APPARATUS.

SPECIFICATION forming part of Letters Patent No. 569,605, dated October 20, 1896.

Application filed October 14, 1895. Serial No. 565,605. (No model.)

*To all whom it may concern:*

Be it known that I, JOHN BERNTSEN, a citizen of the United States, residing at Albert Lea, in the county of Freeborn, State of Minnesota, have invented certain new and useful Improvements in Bread-Raising Apparatus, of which the following is a specification.

My invention relates to apparatus for steaming the dough during the process of raising, and the object I have in view is to provide a simple and durable apparatus which can be easily connected to the tea-kettle in the kitchen and provided with shelves to receive the pans of dough, whereby the same will be thoroughly steamed during the process of raising and the trouble and annoyance of the loaves becoming hard upon top on account of exposure to the air, as in the ordinary process, entirely avoided.

A further object is to provide means whereby slices of dry bread may be quickly and thoroughly steamed, preparatory to making toast, or for any other purpose.

My invention consists generally in various constructions and combinations, all as hereinafter described, and particularly pointed out in the claims.

Figure 3:
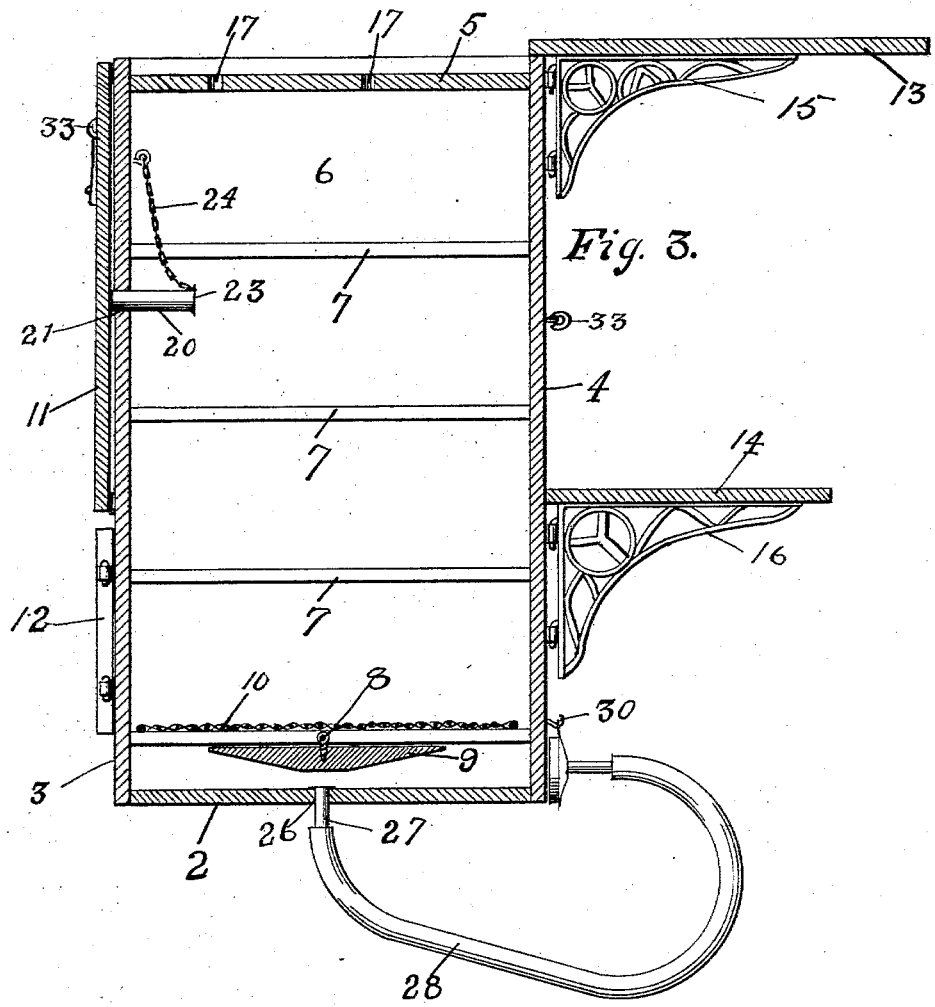
Figure 4:
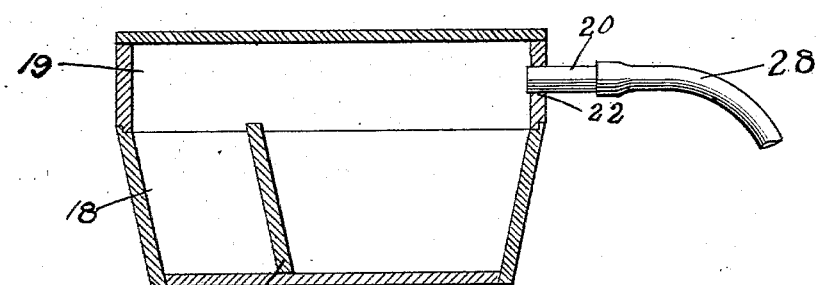

In the accompanying drawings, forming part of this specification, Figure 1 is a plan view of my invention, the upper shelf being broken away, showing the top of the apparatus beneath. Fig. 2 is a side elevation of the same, showing the connection to a tea-kettle. Fig. 3 is a vertical sectional view showing the interior of the steaming apparatus. Fig. 4 is a sectional view of the kneading-pan.

In the drawings I have shown a rectangular box or casing comprising the bottom 2, the sides 3 and 4, the top 5, and a suitable back 6, which all together form the body or main portion of the steaming apparatus. The apparatus may be provided with a suitable base or legs or it may be secured to the wall in any suitable manner.

Arranged within the main portion of the apparatus is a series of shelves 7, one above the other, each composed of several slats with a space between them to permit the steam to pass freely up through the same. A rod 8 extends through the slats composing the lower shelf near the middle portion thereof, and suspended from this rod by a screw-eye which is slidable thereon is a disk 9, having a beveled lower surface which deflects the steam over against the walls of the apparatus and causes the same to be equally distributed therein. I also provide a removable screen or grating 10, which may be placed upon any one of the shelves, and upon which slices of bread may be placed when it is desired to steam the same.

A shelf 11 is hinged to the outer surface of the side 3, near the middle portion thereof, and may be turned up against the side, and when dropped down to a horizontal position is supported by a swinging bracket 12, arranged beneath. This bracket is provided on its edge with hooks which fit into screw-eyes in the side of the body of the apparatus and may be removed at any time. The opposite side 4 of the apparatus is provided with similar shelves 13 and 14, which are also adapted to be turned up to a vertical position, and when dropped down to be supported by brackets 15 and 16, similar to the bracket upon the side 3.

The shelf 13 is hinged to the extreme upper end of the side 4 and is adapted to be turned down over the top 5, which is dropped down below the upper end of the sides 3 and 4, so that the shelf 13, when turned over the top, will fill the depression and its upper surface will be flush with the upper end of the sides 3 and 4, as shown in Fig. 3. The top 5 is provided with a series of holes 17, through which the steam is permitted to escape when desired.

I provide a kneading-pan 18, having a tight-fitting cover 19, which is adapted to be placed upon the shelf 11 and connected with the interior of the apparatus by a tube 20, which extends through an opening 21 in the side 3 and a similar opening 22 in the cover of the kneading-pan. This tube is provided with a flange 23, which prevents it from being pushed entirely through the opening, and a suitable chain or cord 24 is connected to the flanged end of the tube and the opposite end of the chain is secured to a staple driven into the side 3.

The kneading-pan is provided with a movable partition 25, by means of which the dough may be heaped up in one end of the pan, while the opposite end may be used as a receptacle for flour.

The bottom 2 is provided with an opening 26 near its center to receive the end of a nipple 27 on the end of a rubber or other flexible tube 28, which at its opposite end is provided with a cap or cover adapted to fit over the opening 29 in the top of the tea-kettle, as shown in Fig. 2. When the tube is not in use, it may be hung up on the hook 30 at the lower end of the side 4.

A door 31 is hinged to the side 4 and is adapted to close the front of the casing or main body of the apparatus and to be secured by a suitable hook 32. The shelves 11 and 14 are provided with openings near their outer end to receive screw-eyes 33 in the sides 3 and 4, and each shelf is provided upon its lower side with a hook to enter the screw-eye and hold the shelf in a vertical position.

When it is desired to mix up the dough, the shelf 11 is let down to a horizontal position and the dough kneaded in the pan 18 until it is of the desired consistency. The cover is then placed on the pan, the tube 20 connected thereto, and steam admitted to the main body of the apparatus. The steam will pass through the tube 20 and keep the top of the dough moist during the process of raising. After the dough has been raised sufficiently in the large pan it is made up into loaves and placed in tins and then placed on the shelves in the main portion of the device. After raising in the tins the loaves are placed in the oven and baked, and while changing the tins from the shelves to the oven or while transferring the dough from the kneading-pan to the tins the shelves 13 and 14 will be found very convenient, on which the empty or filled tins may be placed while the changes are being made. Should too much steam accumulate in the main portion of the device, the shelf may be raised at any time and the steam allowed to pass out through the openings 17 in the top 5. As the steam passes up through the opening in the bottom 2 it strikes the inclined under surface of the disk 9 and is deflected toward the walls of the device, and thereby the heat is equalized and made uniform throughout the main portion of the apparatus.

Whenever desired, the disk may be moved along on the rod 8, so that it will be nearer the front or back of the device, as may be desired.

I have shown the apparatus made of wood and having nicely-fitting joints, so that there will be very little escape of steam while the device is in use.

Having thus described my invention, I claim as new and desire to secure by Letters Patent—

1. In a device of the class described, the combination with the main body or casing, of the kneading-pan arranged adjacent thereto, the pipe connecting the interior of said main body or casing with the interior of said kneading-pan, and means for supplying steam to said main body or casing to be conveyed through said pipe to said kneading-pan, for the purpose set forth.

2. In a device of the class described, the combination, with the main body or casing, provided with a swinging shelf on its side, of the kneading-pan arranged upon said shelf, means connecting the interior of said pan with the interior of said main body or casing, the tube leading into the lower part of said main body or casing, means for supplying steam to said casing through said tube, and the deflector arranged within said casing over the steam-inlet in the lower part thereof, for the purpose set forth.

3. In a device of the class described, the combination, with the main body or casing, of the shelves hinged to the sides thereof, means for supporting said shelves in a horizontal position, the kneading-pan arranged upon one of said shelves, the tube connecting said pan with the interior of said casing, means for supplying steam to said casing, the top of said casing or main body being provided with a series of openings, and one of said shelves being adapted to cover said openings, substantially as described.

4. A bread-raising apparatus comprising the main portion or box provided with a series of shelves whereon the pans of dough may be placed, the tube or pipe connecting the lower portion of said box with the steam-boiler, a dough-kneading box arranged adjacent to said main portion a tube connecting the interior of said main portion with said kneading-box whereby the steam may be introduced into the latter from said main portion, and said box being provided in its top with a series of openings and means for closing the same, substantially as described.

5. A bread-raising apparatus comprising the main portion or box, provided with a series of shelves, means connecting the lower portion of said box with a steam receptacle or boiler, suitable outlets being provided in the top of said box to permit the escape of steam, means for closing the same, and a horizontally-movable deflector supported above the steam-inlet opening, whereby the steam may be deflected from one side of the box to the other, for the purpose set forth.

In testimony whereof I have hereunto set my hand this 30th day of September, A. D. 1895.

JOHN BERNTSEN.

In presence of—
MAUD F. ANNIS,
HEMAN BLACKMER.